(12) United States Patent
Wada et al.

(10) Patent No.: US 6,288,160 B1
(45) Date of Patent: Sep. 11, 2001

(54) AQUEOUS DISPERSION AND WATERPROOFING MATERIAL

(75) Inventors: Susumu Wada; Katsuhiko Imoto; Kayoko Honda, all of Settu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/308,844

(22) PCT Filed: Nov. 28, 1997

(86) PCT No.: PCT/JP97/04347

§ 371 Date: Jul. 21, 1999

§ 102(e) Date: Jul. 21, 1999

(87) PCT Pub. No.: WO98/23680

PCT Pub. Date: Jun. 4, 1998

(30) Foreign Application Priority Data

Nov. 28, 1996 (JP) .................................................. 8-334520

(51) Int. Cl.⁷ ...................................................... C08L 83/06
(52) U.S. Cl. ................... 524/506; 524/269; 524/837; 524/805; 427/387; 427/412.3; 106/2; 106/287.13; 106/287.16
(58) Field of Search ...................................... 524/269, 506, 524/837, 805; 427/387, 412.3; 106/2, 287.13, 287.16

(56) References Cited

U.S. PATENT DOCUMENTS

| 5,112,393 | 5/1992 | Engel et al. ............................ 106/2 |
| 5,226,954 | 7/1993 | Suzuki .................................... 106/2 |
| 5,349,003 | * 9/1994 | Kato et al. . |

FOREIGN PATENT DOCUMENTS

| 0 795 592 A1 | 9/1997 | (EP) . |
| 2074181 | * 10/1981 | (GB) . |
| 2 301 102 A | 11/1996 | (GB) . |
| 8-259892 | * 10/1996 | (JP) . |

* cited by examiner

Primary Examiner—Robert Dawson
Assistant Examiner—Kuo-Liang Peng
(74) Attorney, Agent, or Firm—Connolly Bove Lodge & Hutz

(57) ABSTRACT

It is an object of the present invention to provide an aqueous dispersion and a waterproofing agent, which are of the aqueous one-component type and easy and simple to apply and have both a decorative effect and enough waterproofing effect.

The aqueous dispersion of the present invention comprises an organosilicon compound (1) represented by the general formula (I):

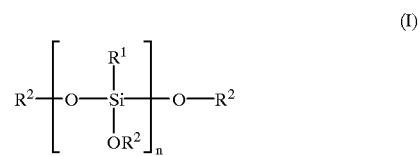

and a fluorine-containing resin (2) comprising an aqueous fluororesin dispersion, and the weight ratio, on the solid basis, between said organosilicon compound (1) and said fluorine-containing resin (2) is (organosilicon compound (1)):(fluorine-containing resin (2))=60:40 to 97:3.

17 Claims, No Drawings

AQUEOUS DISPERSION AND WATERPROOFING MATERIAL

TECHNICAL FIELD

The present invention relates to an aqueous dispersion and a waterproofing agent, which, when applied to the surface of porous building and construction materials, maintains their waterproofing and decorative effects for a prolonged period of time.

BACKGROUND ART

Porous building and construction materials are widely used in various fields of building, building materials and so forth. As such porous building and construction materials, there may be mentioned, for example, architectural concrete, light-weight concrete, precast concrete, autoclaved light-weight concrete (ALC), asbestos slates, mortar, calcium silicate boards, pulp cement boards, cemented excelsior, gypsum boards, hard boards, plaster, bricks, blocks, tiles, gypsum plaster, dolomite plaster, natural stones, artificial stones, glass wool and other inorganic porous building and construction materials; and wood, plywood, particle boards and other organic porous building and construction materials.

Without thorough waterproofing treatment, moisture may penetrate into the interior of these porous building and construction materials and cause cracking due to expansion or the like and, in cases where there are reinforcing bars within said materials, may induce rusting of said reinforcing bars, which, in turn, may cause cracking due to expansion. Furthermore, if the waterproofing treatment is insufficient, the so-called color of wetting appears on the surface, causing a decrease in decorative effect.

So far, organosilicon compounds have been used as waterproofing agents for coating the surface of porous building and construction materials therewith or causing them to be absorbed by said materials to thereby prevent said materials from water absorption. They have a drawback, however, in that when used under conditions under which moisture remains on the material surface for a long period of time, they can no longer produce a sufficient waterproofing effect.

In Japanese Kokai Publication Hei-03-232527, there is disclosed a technology of using alkylalkoxysilanes as permeative, water absorption inhibitors for concrete by making them aqueous without using any solvent. This technology consists in making alkylakoxysilanes known to have a waterproofing effect aqueous by using a specific emulsifier to thereby prevent environmental pollution by organic solvents and, at the same time, attain a good waterproofing effect by causing said silanes to acquire a permeating ability. However, the effect is poor from the long-term effect viewpoint.

The decorative effect on porous building and construction materials has also been studied. In Japanese Kokai Publication Hei-05-124880, there is disclosed a method of finishing which comprises applying, to such materials, an undercoat composition comprising an aqueous silicone compound as a main component and then an overcoat composition comprising a fluororesin paint containing or free of a pigment. According to this technology, in addition to the above-mentioned waterproofing effect, a decorative effect can also be produced, giving an architectural concrete-like appearance, for instance.

However, this technology requires substrates to be coated twice, hence is troublesome to apply in field operation, and, at the same time, still has problems of reproducibility and quality maintenance.

In Japanese Kokai Publication Hei-04-33942, it is disclosed that an aqueous coating composition comprising an aqueous fluoroolefin-based resin dispersion (A) and an aqueous fluoroalkyl-containing resin dispersion (B) is useful as a coating composition having excellent weather resistance, chemical resistance, staining resistance and like properties. In this technology, however, the aqueous fluoroolefin-based resin dispersion (A) means an emulsion copolymer of various $\alpha,\beta$-ethylenically unsaturated compounds among which a fluoroolefin or fluoroolefins are main components (the above-cited publication, page 3, upper right column, lines 10 ff.) and the aqueous fluoroalkyl-containing resin dispersion (B) refers to an emulsion copolymer of various vinyl monomers among which a fluoroalkyl-containing vinyl monomer or monomers are main components (the above-cited publication, page 4, lower left column, lines 1 ff.), and both the constituents are thus restricted in their constitutions. The effects producible by said coating composition fail to include the expression of a waterproofing effect.

In Japanese Kokai Publication Hei-08-259892, it is disclosed that a resin composition for an aqueous coating composition which comprises a synthetic resin emulsion and an emulsion of a silicon compound and/or a partial hydrolyzate-condensate can form paint films excellent in weather resistance and water resistance. However, the synthetic resin emulsion to be used in this technology is a vinyl polymer or the like and the effects obtainable are restricted to weather resistance, staining resistance and the like.

SUMMARY OF THE INVENTION

Under the circumstances mentioned above, it is an object of the present invention to provide an aqueous dispersion and a waterproofing agent for porous building and construction materials, which are of the aqueous one-component type and easy and simple to apply and have both a decorative effect and enough waterproofing effect.

The aqueous dispersion of the present invention comprises an organosilicon compound (1) represented by the general formula (I):

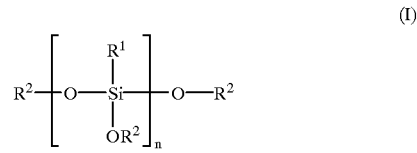

(wherein $R^1$ represents a saturated alkyl group containing 1 to 18 carbon atoms and may be the same or different when n is 2 or more; $R^2$ represents a saturated alkyl group containing 1 to 5 carbon atoms and may be the same or different when n is 2 or more; and n represents an integer of 1 to 9), and a fluorine-containing resin (2) comprising an aqueous fluororesin dispersion, and the weight ratio, on the solid basis, between said organosilicon compound (1) and said fluorine-containing resin (2) is (organosilicon compound (1)):(fluorine-containing resin (2))=50:50 to 99:1.

The waterproofing agent of the present invention comprises the above aqueous dispersion.

DETAILED DESCRIPTION OF THE INVENTION

In the following, the present invention is described in detail.

The aqueous dispersion of the present invention comprises the organosilicon compound (1) and the fluorine-containing resin (2).

The organosilicon compound (1) is first described.

Said organosilicon compound (1) is represented by the above general formula (I).

The saturated alkyl group containing 1 to 18 carbon atoms as represented by the above-mentioned $R^1$ is not particularly restricted but includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl. These may be straight-chained or branched. Among them, saturated alkyl groups containing 5 to 18 carbon atoms are particularly preferred.

The saturated alkyl group containing 1 to 5 carbon atoms as represented by the above-defined $R^2$ is not particularly restricted but includes methyl, ethyl, propyl, butyl and pentyl. These may be straight-chained or branched.

The n defined above is an integer of 1 to 9.

As the above organosilicon compound (1), there may be mentioned, more specifically, for instance, methyltrimethoxysilane, ethyltrimethoxysilane, propyltrimethoxysilane, butyltrimethoxysilane, pentyltrimethoxysilane, hexyltrimethoxysilane, heptyltrimethoxysilane, octyltrimethoxysilane, nonyltrimethoxysilane, decyltrimethoxysilane, undecyltrimethoxysilane, dodecyltrimethoxysilane, tridecyltrimethoxysilane, tetradecyltrimethoxysilane, pentadecyltrimethoxysilane, hexadecyltrimethoxysilane, heptadecyltrimethoxysilane, octadecyltrimethoxysilane, methyltriethoxysilane, ethyltriethoxysilane, propyltriethoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane and the like.

Dimers and the like of the above organosilicon compounds may also be used as the organosilicon compound (1) to be used in the present invention. As such, there may be mentioned, for instance, those of the above general formula (I) in which n is 2. Those in which n is an integer up to 9 may further be used.

In preparing the aqueous dispersion of the present invention, the above organosilicon compound (1) is used after emulsification. Such emulsification can be carried out by per Ad known methods, for example by the method using an emulsifier. Said emulsifier is not particularly restricted but includes, for example, a nonionic emulsifier, an anionic emulsifier or the like.

Said nonionic emulsifier is not particularly restricted but includes, for example, ordinary nonionic emulsifiers such as glycerol monostearate, glycerol monooleate, sorbitan monolaurate, sorbitan monopalmitate, sorbitan monostearate, sorbitan monooleate, sorbitan monotrioleate, sorbitan monosesquioleate, polyoxyethylenesorbitan monolaurate, polyoxyethylenesorbitan monopalmitate, polyoxyethylenesorbitan monostearate, polyoxyethylene- sorbitan monooleate, polyoxyethylenesorbitan monotrioleate, polyoxyethylenesorbitan monosesquioleate, polyoxyethylenesorbitol tetraoleate, polyoxyethylene lauryl ether, polyoxyethylene cetyl ether, polyoxyethylene stearyl ether, polyoxyethylene oleyl ether, polyoxyethylene higher alcohol ether, polyoxyethylene octylphenyl ether, polyoxyethylene nonylphenyl ether, polyoxyethylene nonylphenyl ether and the like.

As the above nonionic emulsifier, there may also be mentioned fluorine-containing emulsifiers, silicone type emulsifiers and the like. As said fluorine-containing emulsifiers, there may be mentioned, among others, those to be described later herein in detail under the section directed to the fluorine-containing resin (2). As the silicone type emulsifiers mentioned above, there may be mentioned, for example, those polyalkylene-modified polydimethylsiloxane compounds represented by the following two general formulas:

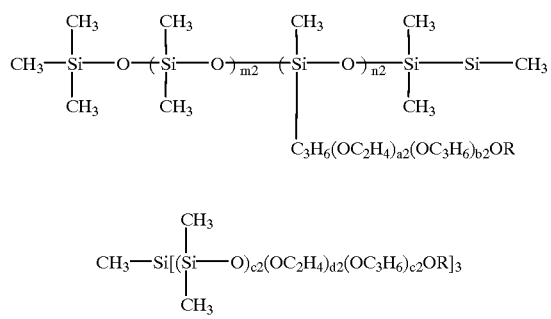

In the above formulas, R represents a hydrogen atom or an alkyl group. m2, n2, a2, b2, c2, d2 and e2 each represents an integer which indicates the number of repetitions.

The anionic emulsifier mentioned above is not particularly restricted but includes, for example, sodium lauryl sulfate, ammonium lauryl sulfate, sodium dodecylbenzenesulfonate, sodium alkylnaphthalenesulfonate, sodium dialkyl sulfosuccinate, disodium alkyldiphenyl ether disulfonate, alkylphosphoric acid diethanolamine salts, alkylphosphoric acid potassium salts, sodium polyoxyethylene lauryl ether sulfate, polyoxyethylene alkyl ether sulfuric acid triethanolamine salts, sodium polyoxyethylene alkylphenyl ether sulfates, sodium alkanesulfonates, mixed fatty acid soda soap, semihardened beef tallow fatty acid soda soap, semihardened beef tallow fatty acid potash soap, stearic acid soda soap, oleic acid potash soap, castor oil potash soap, sodium higher alcohol sulfates, β-naphthalenesulfonic acid-formaldehyde condensate sodium salt, special aromatic sulfonic acid-formaldehyde condensates, special carboxylic acid type surfactants, special polycarboxylic acid type surfactants, special polycarboxylic acid type macromolecular surfactants, etc.

The proportion of the anionic emulsifier in the whole emulsifier is not particularly restricted but preferably is 0.01 to 20% by weight. Any of the above-mentioned nonionic emulsifiers and any of the above-mentioned anionic emulsifiers may respectively be used either alone or in combination, or a nonionic emulsifier and an anionic emulsifier may be used in combination. The combined use of any of the above-mentioned nonionic emulsifiers and any of the above-mentioned anionic emulsifiers is preferred, however. Preferred as the nonionic emulsifier are polyalkylene oxide-modified polydimethylsiloxanes and fluorinated alkyl-containing polyalkylene oxides are preferred.

The method of emulsifying the organosilicon compound (1) of the present invention using the above-mentioned emulsifier(s) is not particularly restricted. For example, emulsification can be effected by gradually adding water dropwise to a mixture of said organosilicon compound (1) and the above-mentioned emulsifier(s) with stirring at a high speed using a homomixer or the like. If the resulting emulsion is in a completely homogeneous state after stirring in that manner, a stable emulsion-like aqueous dispersion can be obtained upon addition of water. In some instances, portionwise addition of water may initially result in an increase in concentration and viscosity or formation of an insoluble matter or formation of a transparent solution. However, by gradually increasing the amount of water, a homogeneous aqueous dispersion can be obtained.

Since the organosilicon compound (1) has now been fully described, the fluorine-containing resin (2) is described in the following.

Said fluorine-containing resin (2) comprises an aqueous fluororesin dispersion.

Said fluorine-containing resin (2) may comprise either a fluororesin or a mixture of a fluororesin and some other resin. Said other resin may be, for instance, an acrylic resin, an acryl-silicone resin, an epoxy resin, a urethane resin, an ester-type resin or the like. From the viewpoint of stability and durability of the waterproofing agent of the present invention, an acrylic resin is preferred.

As is evident from the above description, the "fluorine-containing resin" so referred to in the present specification means the above-mentioned "fluororesin" itself or a mixture of said "fluororesin" and some "other resin". Furthermore, in the present specification, the "other resin" means an acrylic resin, acryl-silicone resin, an epoxy resin, a urethane resin, an ester-type resin or the like, preferably an acrylic resin alone.

The acrylic resin as said other resin will be described later herein in detail.

The fluororesin mentioned above roughly includes the following four categories of resins: (1) Fluororesin comprising a copolymer of a fluoroolefin and a vinyl monomer; (2) Fluororesin comprising a copolymer of fluoroolefins; (3) Fluororesin comprising a homopolymer of a fluoroolefin; and (4) Fluororesin derived from the above-mentioned fluororesin (1), fluororesin (2) or fluororesin (3) and an acrylic resin by seed polymerization in an aqueous fluororesin dispersion.

As is evident from the above description, the term "fluororesin" as used in the present specification means a copolymer of one or more fluoroolefins and one or more vinyl monomers, a copolymer of two or more fluoroolefins, or a homopolymer of a fluoroolefin. In the present specification, the term "fluororesin" also means, in addition to the above (1) to (3), a fluororesin (4) containing an acrylic resin resulting from seed polymerization, which is obtained by causing acrylic monomer(s) to form a composite resin in an aqueous medium in the presence of aresin particles comprising the above-mentioned fluororesin (1), fluororesin (2) or fluororesin (3).

In the following, the acrylic resin as the other resin constituting the fluorine-containing resin of the present invention is described.

Said acrylic resin is not particularly restricted provided that it is a polymer whose main chain is a hydrocarbon chain derived from an acrylic acid and/or methacrylic acid. Generally, it includes, among others, homopolymers of an acrylic monomer, and copolymers of an acrylic monomer and other monomer(s) having an ethylenically unsaturated double bond copolymerizable therewith.

Said acrylic monomer is not particularly restricted provided that it contains an acrylic acid and/or methacrylic acid (hereinafter also referred to as "(meth)acrylic acid"). Thus, it may be acrylic acid, an alkyl acrylate, methacrylic acid or an alkyl methacrylate, for instance.

Said alkyl (meth)acrylate is not particularly restricted but includes, for instance, alkyl acrylates whose alkyl moiety contains 1 to 18 carbon atoms, and alkyl methacrylates whose alkyl moiety contains 1 to 18 carbon atoms.

As such alkyl acrylates whose alkyl moiety contains 1 to 18 carbon atoms, there may be mentioned methyl acrylate, ethyl acrylate, n-propyl acrylate, isopropyl acrylate, n-butyl acrylate, i-butyl acrylate, t-butyl acrylate, 2-ethylhexyl acrylate, cyclohexyl acrylate, n-hexyl acrylate, t-butylcyclohexyl acrylate, stearyl acrylate and lauryl acrylate, among others.

As said alkyl methacrylates whose alkyl moiety contains 1 to 18 carbon atoms, there may be mentioned methyl methacrylate, ethylmethacrylate, n-propylmethacrylate, isopropylmethacrylate, n-butylmethacrylate, i-butylmethacrylate, t-butylmethacrylate, 2-ethylhexyl methacrylate, cyclohexyl methacrylate, n-hexyl methacrylate, t-butylcyclohexyl methacrylate, stearyl methacrylate and lauryl methacrylate, for instance.

The acrylic monomers mentioned above may be copolymerized with a polyfunctional monomer such as ethylene glycol dimethacylate or propylene glycol dimethacrylate for the purpose of improving the solvent resistance and water resistance.

As the monomer having an ethylenically unsaturated bond copolymerizable with the acrylic ester mentioned above and methacrylic ester mentioned above, there may be mentioned, among others, those mentioned below under (I) and (II). (I) Monomers having a reactive functional group, for example, ethylenically unsaturated carboxylic acids such as maleic acid, itaconic anhydride, succinic anhydride, crotonic acid, etc.; amide compounds such as acrylamide, methacrylamide, N-methylacrylamide, N-methylolacrylamide, N-butoxymethylacrylamide, N-methylolmethacrylamide, N-methylmethacrylamide, N-butoxymethylmethacrylamide, etc.; hydroxyl-containing monomers such as hydroxyethyl acrylate, hydroxyethyl methacrylate, hydroxypropyl acrylate, hydroxypropyl methacrylate, etc.; epoxy-containing monomers such as glycidyl acrylate, glycidyl methacrylate, etc.; silanol-containing monomers such as Y-methacryloxypropyltrimethoxysilane, Y-methacryloxypropyltriethoxysilane, etc.; aldehyde group-containing monomers such as acrolein etc.; caprolactone-modified hydroxy acrylates, and caprolactone-modified hydroxy methacrylates. (II) Other vinyl compounds, for example, α-olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyl compounds such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 and VEOVA 10 (products of Shell), etc.; ethylenically unsaturated carboxylic acids such as itaconic anhydride, succinicanhydride, crotonicacid, etc.; aromaticvinyl compounds such as styrene, α-methylstyrene, p-tert-butylstyrene, etc.; acrylonitrile, and the like.

Use may also be made, as the monomer having an ethylenically unsaturated bond copolymerizable with the acrylic ester mentioned above and methacrylic ester mentioned above, of compounds containing, within the molecule thereof, a hydrophilic site-containing, low-molecular-weight polymer or oligomer. The hydrophilic site means a site having a hydrophilic group or a site having a hydrophilic bond, or a site comprising a combination of these. Said hydrophilic group may be an ionic, nonionic or amphoteric one or a combination of these. Nonionic or anionic hydrophilic groups are preferred, however. Any known reactive emulsifier may also be used.

As said monomer having an ethylenically unsaturated bond copolymerizable with the acrylic ester mentioned above and methacrylic ester mentioned above, or the reactive emulsifier, there may be mentioned, for example, polyethylene glycol methacrylate, polypropylene glycol methacrylate, methoxypoly-ethylene glycol methacrylate, polyethylene glycol acrylate, polypropylene glycol acrylate, methoxypolyethylene glycol acrylate, polyethylene glycol allyl ether, methoxypolyethylene glycol allyl ether, polyethylene glycol-polypropylene glycol monomethacrylate, polyethylene glycol-polytetramethylene glycol monomethacrylate, polyoxyethylene alkylallylphenyl ether, polyoxyethylene alkylallylphenyl ether sulfuric acid salts, styrenesulfonic acid salts, allylalkylsulfonic acid salts, polyethylene glycol methacrylate sulfate salts, alkylallylsulfosuccinic acid salts, bis(polyoxyethylene-polycyclic phenyl ether) methacrylated sulfuric acid ester salts, polyoxyethylene alkylphenyl ether acrylates, methacryloyloxypolyoxyalkylene sulfate salts, methacryloyloxyalkylene sulfate salts, polyoxyethylene vinyl ether, polyoxyethylene vinyl esters, and so on.

The method of polymerization for preparing a homopolymer of the acrylic monomer mentioned above or a copolymer of said acrylic monomer and other copolymerizable monomer(s) for the purpose of obtaining the acrylic resin of the present invention is not particularly restricted but can adequately be selected from among per se known methods, such as emulsion polymerization, suspension polymerization and bulk polymerization techniques. The molecular weight and other characteristics of the polymer after polymerization can suitably be selected considering the field of application thereof.

In carrying out the polymerization, the polymerization vessel, polymerization method, polymerization initiator, polymerization inhibitor, other auxiliaries, and emulsification promoter, surfactant and the like in emulsion polymerization, and other conditions can be adequately selected from among those known in the art. In selecting these, any of the so-far known ones can be employed on condition that the acrylic resin obtained is an adequate one.

The amount of the acrylic resin to be admixed for constituting the fluorine-containing resin of the present invention is preferably 0 to 90% by weight, more preferably 0 to 80% by weight. If the mixing amount is excessive, the weather resistance will be poor.

The method of admixing is not particularly restricted but a generally known method can be used.

The acrylic resin as the other resin has now been fully described.

In the following, the "aqueous fluororesin dispersion" in relation to the fluorine-containing resin (2) of the present invention is described.

Said aqueous fluororesin dispersion has a basic structure which comprises fluororesin particles being dispersed in an aqueous medium. Said aqueous fluororesin dispersion comprises an aqueous fluororesin dispersion (2-1) prepared by seed polymerization of an acrylic resin and an aqueous fluororesin dispersion (2-2) prepared without seed polymerization of an acrylic resin.

Said aqueous fluororesin dispersion (2-1) can be obtained by causing an acrylic monomer to form a fluorine-containing composite resin in the presence of fluororesin particles in an aqueous medium.

Said aqueous medium is not particularly restricted but includes, among others, water supplemented with an additive, solvent and the like, which is to be mentioned in detail later herein.

In the above-mentioned aqueous fluororesin dispersion (2-1) prepared by seed polymerization of an acrylic resin, the fluororesin constituting the fluororesin particles mentioned above is a fluororesin (2) which is a fluoroolefin copolymer. Said fluoroolefin copolymer is dispersed in the aqueous medium in the form of particles and, in the formation of a fluorine-containing composite resin by the acrylic monomer mentioned above, the polymerization is proceeded in the manner of the so-called seed polymerization. In the present specification, the term "seed polymerization" means a polymerization reaction with other monomer(s) in an aqueous medium in which resin particles are present. Therefore, the fluorine-containing composite resin mentioned above means a seed polymer after said seed polymerization, and said resin particles means seed particles in said seed polymerization.

The fluororesin (2), which is a fluoroolefin copolymer, is described in the following.

Said fluoroolefin is not particularly restricted but includes, among others, vinylidene fluoride (VdF), tetrafluoroethylene (TFE), chlorotrifluoroethylene (CTFE) and hexafluoropropylene (HFP). Said fluoroolefin copolymer is not particularly restricted but includes, among others, VdF/TFE copolymers, VdF/CTFE copolymers, VdF/HFP copolymers, TFE/CTFE copolymers, TFE/HFP copolymers, CTFE/HFP copolymers, VdF/TFE/CTFE copolymers, VdF/TFE/HFP copolymers, VdF/CTFE/HFP copolymers, VdF/TFE/CTFE copolymers, VdF/TFE/HFP copolymers, VdF/CTFE/HFP copolymers, TFE/CTFE/HFP copolymers, VdF/TFE/CTFE/HFP copolymers and the like.

Said fluoroolefin copolymer constituting seed particles mentioned above is preferably a VdF-based copolymer which is a copolymer of VdF and a fluoroolefin other than VdF, more preferably a copolymer containing not less than 70 mole percent of VdF. When VdF accounts for not less than 70 mole percent, the compatibility of the seed particles and the polymer derived from an acrylic monomer(s) becomes good.

The mean particle size of said seed particles is closely related to the mean particle size of the fluorine-containing composite resin after seed polymerization. For the fluorine-containing composite resin after seed polymerization to have a mean particle size of 50 to 300 nm, it is preferred that the seed particles size be 40 to 290 nm.

Said copolymer constituting seed particle can be obtained by ordinary emulsion polymerization techniques. For example, it can be prepared by emulsion polymerization of a monomer mixture containing the fluoroolefin mentioned above in the presence of 0.01 to 1.0% by weight, relative to water, of the hydrophilic site-containing, fluorine-containing reactive emulsifier and 0 to 1.0% by weight, relative to water, of a fluorine-containing emulsifier.

It can be prepared also by emulsion polymerization of a monomer mixture containing said fluoroolefin in the presence of not more than 1.0% by weight, preferably not more than 0.5% by weight, more preferably not more than 0.2% by weight (the lower limit generally being 0.01% by weight), relative to water, of a fluorine-containing surfactant and 0.001 to 0.1% by weight, preferably 0.01 to 0.05% by weight, relative to water, of a nonionic fluorine-freesurfactant. The aqueous dispersion obtained by such a method can stably contain seed particles with a mean particle size of not greater than 0.2 µm and a high concentration of 30 to 50% by weight.

As said hydrophilic site-containing, fluorine-containing reactive emulsifier, there may be mentioned, for example, those having a structure represented by the formula $CF_2=CF-(CF_2CFX)_nY$ (wherein X is F or $CF_3$, Y is $SO_3M$ or COOM (in which M is hydrogen atom, amine, ammonium or alkali metal) and n is an integer), $CF_2=CF-O(CFX)_nY$ (wherein X, Y and n are as defined above), $CH_2=CF-CF_2-O-(CF(CF_3)CF_2O)_n-CF(CF_3)Y$ (wherein Y and n are as defined above) or $CF_2=CF-CF_2-O-(CF(CF_3)CF_2O)_n-CF(CF_3)Y$ (wherein Y and n are as defined above). From the water solubility and surface activity viewpoint, n is preferably within the range of 0 to 3.

More specifically, those having the structure $CF_2=CF-CF_2-O(CF(CF_3)CF2O)_n-CF(CF_3)COOH$ in which n is 0 to 2 are preferably used.

The polymerization temperature is 20 to 120° C., preferably 30 to 70° C. When the polymerization temperature is lower than 20° C., the resulting latex generally has low stability. When the polymerization temperature is higher than 120° C., the polymerization tends to stall due to chain transfer. The polymerization is generally carried out by heating under a pressure of 1.0 to 50 kgf/cm$^2$ (gauge pressure) for 5 to 100 hours, although the conditions depend on the kind of polymer as well.

As said fluorine-containing emulsifier to be used in the emulsion polymerization of seed particles, there may be mentioned a compound or a mixture of two or more compounds containing fluorine atoms in their structure and having surface activity, for example acids represented by $X(CF_2)_nCOOH$ (wherein n represents an integer of 6 to 20 and X represents F or a hydrogen atom) and alkali metal salts, ammonium salts, amine salts or quaternary ammonium salts thereof; acids represented by $Y(CH_2CF_2)_mCOOH$ (wherein m represents an integer of 6 to 13 and Y represents F or a chlorine atom), alkali metal salts, ammonium salts, amine salts or quaternary ammonium salts thereof; and the like. More specifically, mention may be made of perfluorooctanoic acid ammonium salt, perfluorooctanoic acid ammonium salt and the like. Other known fluorine-containing surfactants may also be used.

In the emulsion polymerization for obtaining seed particles, a nonionic fluorine-free surfactant may also be used in small amounts in the presence of a fluorine-containing surfactant. As concrete examples thereof, there may be mentioned polyoxyethylene alkyl ethers, polyoxyethylene alkylphenyl ethers, polyoxyethylene alkyl esters, sorbitan alkyl esters, polyoxyethylenesorbitan alkyl esters, glycerol esters and derivatives thereof, etc.

More specifically, the polyoxyethylene alkyl ethers include polyoxyethylene lauryl ether, polyoxyethylene cetyl ether, polyoxyethylene stearyl ether, polyoxyethylene oleyl ether, polyoxyethylene behenyl ether, etc., the polyoxyethylene alkylphenyl ethers include polyoxyethylene nonylphenyl ether, polyoxyethylene octylphenyl ether, etc., the polyoxyethylene alkyl esters include polyethylene glycol monolaurate, polyethylene glycol monooleate, polyethylene glycol monostearate, etc., the sorbitan alkyl esters include polyoxyethylenesorbitan monolaurate, polyoxyethylenesorbitan monopalmitate, polyoxyethylenesorbitan monostearate, polyoxyethylenesorbitan monooleate, etc., and the glycerol esters include glyceryl monomyristate, glyceryl monostearate, glyceryl monooleate, etc.

As the derivatives of these, polyoxyethylenealkylamines, polyoxyethylenealkylphenyl-formaldehyde condensates, polyoxyethylene alkyl ether phosphoric acid salts and the like. Particularly preferred are polyoxyethylene alkyl ethers and polyoxyethylene alkyl esters, with an HLB value of 10 to 18, specifically polyoxyethylene lauryl ether (EO: 5 to 20; EO indicating the number of ethylene oxide units) and polyethylene glycol monostearate (EO: 6 to 10).

The above-mentioned acrylic monomer used in the practice of the present invention is not particularly restricted but includes, among others, alkyl acrylates containing 1 to 18 carbon atoms in the alkyl moiety, alkyl methacrylates containing 1 to 18 carbon atoms in the alkyl moiety, and monomers having an ethylenically unsaturated bond copolymerizable with these.

As said alkyl acrylates containing 1 to 18 carbon atoms in the alkyl moiety, there may be mentioned, for example, methyl acrylate, ethyl acrylate, n-propyl acrylate, i-propyl acrylate, n-butyl acrylate, i-butyl acrylate, t-butyl acrylate, 2-ethylhexyl acrylate, cyclohexyl acrylate, n-hexyl acrylate, t-butylcyclohexyl acrylate, stearyl acrylate and lauryl acrylate.

As said alkyl methacylates containing 1 to 18 carbon atoms in the alkyl moiety, there may be mentioned, for example, methyl methacrylate, ethylmethacrylate, n-propylmethacrylate, i-propyl methacrylate, n-butylmethacrylate, i-butylmethacrylate, t-butyl methacrylate, 2-ethylhexyl methacrylate, cyclohexyl methacrylate, n-hexyl methacrylate, t-butylcyclohexyl methacrylate, stearyl methacrylate and lauryl methacrylate.

For the purpose of improving the solvent resistance and water resistance, a polyfunctional monomer such as ethylene glycol dimethacrylate or propylene glycol dimethacrylate may be used for copolymerization.

As the monomer having an ethylenically unsaturated bond copolymerizable with the acrylic ester mentioned above and methacrylic ester mentioned above, there may be mentioned, among others, those mentioned below under (I) and (II). (I) Monomers having a reactive functional group, for example, ethylenically unsaturated carboxylic acids such as maleic acid, itaconic anhydride, succinic anhydride, crotonic acid, etc.; amide compounds such as acrylamide, methacrylamide, N-methylacrylamide, N-methylolacrylamide, N-butoxymethylacrylamide, N-methylolmethacrylamide, N-methylmethacrylamide, N-butoxymethylmethacrylamide, etc.; hydroxyl-containing monomers such as hydroxyethyl acrylate, hydroxyethyl methacrylate, hydroxypropyl acrylate, hydroxypropyl methacrylate, etc.; epoxy-containing monomers such as glycidyl acrylate, glycidyl methacrylate, etc.; silanol-containing monomers such as Y-trimethoxysilane methacrylate, Y-triethoxysilane methacrylate, etc.; aldehyde-containing monomers such as acrolein etc.; caprolactone-modified hydroxy acrylates, and caprolactone-modified hydroxy methacrylates. (II) Other vinyl compounds, for example, α-olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyl compounds such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 and VEOVA 10 (products of Shell), etc.; ethylenically unsaturated carboxylic acids such as itaconic anhydride, succinicanhydride, crotonicacid, etc.; aromaticvinyl compounds such as styrene, αmethylstyrene, p-tert-butylstyrene, etc.; acrylonitrile, and the like.

Use may also be made, as the monomer having an ethylenically unsaturated bond copolymerizable with the acrylic ester mentioned above and methacrylic ester mentioned above, of compounds containing, within the molecule thereof, a hydrophilic site-containing, low-molecular-weight polymer or oligomer. The hydrophilic site means a site having a hydrophilic group or a site having a hydrophilic bond, or a site comprising a combination of these. Said hydrophilic group may be an ionic, nonionic or amphoteric one or a combination of these. Nonionic or anionic hydrophilic groups are preferred, however. Any known reactive emulsifier may also be used as said monomer.

As said monomer having an ethylenically unsaturated bond copolymerizable with the acrylic ester mentioned above and methacrylic ester mentioned above, or the reactive emulsifier, there may be mentioned, for example, polyethylene glycol methacrylate, polypropylene glycol methacrylate, methoxypoly-ethylene glycol methacrylate, polyethylene glycol acrylate, polypropylene glycol acrylate, methoxypolyethylene glycol acrylate, polyethylene glycol allyl ether, methoxypolyethylene glycol allyl ether, polyethylene glycol-polypropylene glycol monomethacrylate, polyethylene glycol-polytetramethylene glycol monomethacrylate, polyoxyethylene alkylallylphenyl ether, polyoxyethylene alkylallylphenyl ether sulfuric acid salts, styrenesulfonic acid salts, allylalkylsulfonic acid salts, polyethylene glycol methacrylate sulfate salts, alkylallylsulfosuccinic acid salts, bis(polyoxyethylene-polycyclic phenyl ether) methacrylated sulfuric acid ester salts, polyoxyethylene alkylphenyl ether acrylates, methacryloyloxypolyoxyalkylene sulfate salts, methacryloyloxyalkylene sulfate salts, polyoxyethylene vinyl ether, polyoxyethylene vinyl esters, and so on.

In the present invention, when the above acrylic monomer is subjected to seed polymerization in the presence of fluororesin particles, the fluororesin is first swelled with said acrylic monomer and, at that timepoint, an aqueous dispersion with said acrylic monomer uniformly dissolved therein is formed. Then, upon addition of a polymerization initiator, said acrylic monomer polymerizes, and compatibilized particles comprising molecule chains entangled together. In cases where said acrylic monomer is polyfunctional, an interpenetration network (IPN) structure can be formed. As the polyfunctional acrylic monomer, there may be mentioned, for example, monoglycol dimethacrylate, diglycol dimethacrylate and the like.

The seed polymerization of said acrylic monomer can be carried out by a per se known method, for example by the method comprising charging the whole amount of the acrylic monomer all at once into the reaction system in the presence of fluororesin particles, the method comprising charging a portion of the acrylic monomer, allowing the same to react and then charging the remaining portion either continuously or portionwise, or the method comprising charging the whole amount of the acrylic monomer continuously. The polymerization conditions for the above seed polymerization are the same as in ordinary emulsion polymerization, and the polymerization can be carried out, for example by adding a surfactant, a polymerization initiator and a chain transfer agent and, if necessary, a chelating agent, a pH-adjusting agent and a solvent, and so forth to an aqueous medium containing fluororesin particles and effecting the reaction at a temperature of 10 to 90° C. for 0.5 to 6 hours.

Usable as said surfactant are anionic or nonionic ones or combinations of anionic and nonionic ones. In some instances, amphoteric surfactants may be used as well.

As the anionic surfactants, there may be mentioned, for example, hydrocarbon-based anionic surfactants such as higher alcohol sulfate esters, sodium alkylsulfonates, sodium alkylbenzenesulfonates, succinic acid dialkyl ester, sulfonic acid sodium salts and alkyldiphenyl ether disulfonic acid sodium salts, and fluorine-containing anionic surfactants such as fluoroalkylcarboxylic acid salts, fluoroalkylsulfonic acid salts, and fluoroalkyl sulfate esters.

As the nonionic surfactants, there may be mentioned, for example, polyoxyethylene alkyl ethers, polyoxyethylene alkylphenyl ethers, polyoxyethylene alkyl esters, polyoxyethylene alkylphenyl esters, sorbitan alkyl esters, glycerol esters and derivatives thereof.

As said amphoteric surfactants, there may be mentioned, for example, laurylbetaine and the like.

As the surfactant mentioned above, the so-called reactive emulsifiers copolymerizable with the acrylic monomer can be used as well. Furthermore, such reactive surfactants may be used in combination with the emulsifiers mentioned above.

The surfactant is used generally in an amount of 0.05 to 5.0 parts by weight per 100 parts by weight of the acrylic monomer.

The polymerization initiator to be used in the above seed polymerization is not particularly restricted provided that it generates radicals available for the free radical reaction in the aqueous medium at between 20 to 90° C. In some instances, the use thereof in combination with a reducing agent is also possible. As such, there may be mentioned polymerization initiators generally soluble in water, such as persulfuric acid salts and hydrogen peroxide, and reducing agents such as sodium pyrobisulfite, sodium hydrogen sulfite, sodium L-ascorbate, Rongalite and the like, and oil-soluble polymerization initiators such as diisopropyl peroxydicarbonate (IPP), benzoyl peroxide, dibutyl peroxide, azobisisobutyronitrile (AIBN) and so on.

Generally, the above polymerization initiator is used in an amount of 0.05 to 2.0 parts by weight per 100 parts by weight of the acrylic monomer.

As the chain transfer agent to be used in the above seed polymerization, there may be mentioned, for example, halogenated hydrocarbons such as chloroform and carbon tetrachloride; and mercaptans such as n-dodecylmercaptan, tert-dodecylmercaptan and n-octylmercaptan. Generally, said chain transfer agent is used in an amount of 0 to 5.0 parts by weight per 100 parts by weight of the acrylic monomer.

The amount of the solvent to be used in the above seed polymerization is such that the processability, disaster prevention and safety, environmental friendliness and production safety will not be impaired, for example not more than 20% by weight and, as examples of said solvent, there may be mentioned, for example, methyl ethyl ketone, acetone, trichlorotrifluoroethane, methyl isobutyl ketone, cyclohexanone, methanol, ethanol, propanol, butanol, ethylcellosolve, butylcellosolve, methylcarbitol, ethylcarbitol, butylcarbitol, dioxane, butylcarbitol acetate, thexanol, ethyl acetate, butyl acetate and the like.

The addition of such a solvent may improve the swellability of the fluororesin particles with the acrylic monomer in some instances.

In the present invention, the fluororesin particles in the aqueous fluororesin medium preferably have a particle size of 50 to 300 nm, more preferably 50 to 200 nm.

When the particle size is less than 50 nm, the viscosity of the aqueous fluororesin dispersion markedly increases within the practical concentration range of not less than 30%, making troubles in paint making operation. When said particle size exceeds 300 nm, the resulting aqueous dispersion will have poor precipitation stability and, even if the resin constitution is of the same composition, the lowest film-forming temperature of the aqueous fluororesin dispersion will rise.

In addition to the aqueous fluororesin dispersion (2-1) mentioned above in detail, the aqueous fluororesin dispersion of the present invention can also comprise the aqueous fluororesin dispersion (2-2). Said aqueous fluororesin dispersion (2-2) is an aqueous fluororesin dispersion prepared without seed polymerization of any acrylic resin.

Said aqueous fluororesin dispersion (2-2) has a basic structure which comprises fluororesin particles being dispersed in an aqueous medium. The fluororesin constituting said fluororesin particles is a fluororesin (2) comprising a copolymer of fluoroolefins or a fluororesin (1) comprising a copolymer of a fluoroolefin and a vinyl monomer. Said fluororesin (2) comprising a copolymer of fluoroolefins is the same as that already described in relation to the aqueous fluororesin dispersion (2-1).

Said fluororesin (1) comprising a copolymer of a fluoroolefin and a vinyl monomer is preferably as follows.

As the above-mentioned fluoroolefin constituting said fluororesin (1), there may be mentioned fluoroolefins containing about 2 to 4 carbon atoms, such as vinyl fluoride (VF), vinylidene fluoride (VdF), tetrafluoroethylene (TFE), chlorotrifluoroethylene (CTFE), hexafluoropropylene (HFP), trifluoroethylene (TrFE), etc.

As said vinyl monomer, there may be mentioned olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyls such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 (product of Shell), VEOVA 10 (product of Shell), etc.; and ethylenically unsaturated carboxylic acids such as itaconic anhydride, succinic anhydride, crotonic acid, etc., among others.

As said fluororesin (1) comprising a copolymer of a fluoroolefin and a vinyl monomer there may be mentioned CTFE/vinyl ether copolymers, CTFE/vinyl ester copolymers, TFE/vinyl ether copolymers, TFE/vinyl ester copolymers, TFE/ethylene copolymers, TFE/propylene copolymers, CTFE/ethylene copolymers, CTFE/propylene copolymers, CTFE/ethylene/vinyl ether copolymers, CTFE/ethylene/vinyl ester copolymers, and derivatives of these copolymers as modified with a small amount of other copolymerizable monomer(s).

As the method of preparing the above-mentioned aqueous fluororesin dispersion (2-2), there may be mentioned, for example, the phase conversion method comprising preparing the fluororesin to constitute fluororesin particles by polymerization thereof in a solvent, for instance, and then dispersing said resin in water in the presence of an emulsifier, followed by distilling off the solvent, and the method comprising carrying out emulsion polymerization of the fluororesin to constitute fluororesin particles in an aqueous medium. For reducing the solvent and simplifying the process, the method comprising emulsion polymerization in an aqueous medium is preferred.

Said emulsion polymerization can be conducted in the same manner as in ordinary emulsion polymerization, for example by reacting a fluoroolefin and a monomer such as a monomer copolymerizable with the fluoroolefin in a closed vessel in an aqueous medium in the presence of a surfactant, a polymerization initiator and a chain transfer agent and, if necessary, a chelating agent, a pH-adjusting agent and a solvent, for instance, at a temperature of 10 to 90° C. for 0.5 to 40 hours.

Usable as said surfactant are anionic or nonionic ones or combinations of anionic and nonionic ones. In some instances, amphoteric surfactants may be used as well.

As said anionic surfactants, there may be mentioned, for example, hydrocarbon-based anionic surfactants such as higher alcohol sulfate esters, sodium alkylsulfonates, sodium alkylbenzenesulfonates, succinic acid dialkyl ester sulfonic acid salts and alkyldiphenyl ether disulfonic acid sodium salts, and fluorine-containing anionic surfactants such as fluoroalkylcarboxylic acid salts, fluoroalkylsulfonic acid salts, and fluoroalkyl sulfate esters.

As said nonionic surfactants, there may be mentioned, for example, polyoxyethylene alkyl ethers, polyoxyethylene alkylphenyl ethers, polyoxyethylene alkyl esters, polyoxyethylene alkylphenyl esters, sorbitan alkyl esters, glycerol esters and derivatives thereof.

As said amphoteric surfactants, there may be mentioned, for example, laurylbetaine and the like.

As the surfactant mentioned above, the so-called reactive emulsifiers, for instance, can be used as well. Furthermore, such reactive surfactants may be used in combination with the emulsifiers mentioned above.

The polymerization initiator used in the above emulsion polymerization is not particularly restricted provided that it generates radicals available for the free radical reaction in the aqueous medium at between 10 to 90°C. In some instances, the use thereof in combination with a reducing agent is also possible. As such, there may be mentioned polymerization initiators generally soluble in water, such as persulfuric acid salts and hydrogen peroxide, and reducing agents such as sodium pyrobisulfite, sodium hydrogen sulfite, sodium L-ascorbate, Rongalite and the like, and oil-soluble polymerization initiators such as diisopropyl peroxydicarbonate (IPP), benzoyl peroxide, dibutyl peroxide, azobisisobutyronitrile (AIBN) and so on.

As the chain transfer agent used in the above emulsion polymerization, there may be mentioned, for example, halogenated hydrocarbons such as chloroform and carbon tetrachloride; and mercaptans such as n-dodecylmercaptan, tert-dodecylmercaptan and n-octylmercaptan.

The amount of the solvent used in the above emulsion polymerization is used such that the processability, disaster prevention and safety, environmental friendliness and production safety will not be impaired, for example not more than 20% by weight and, as examples of the solvent, there may be mentioned, methyl ethyl ketone, acetone, trichlorotrifluoroethane, methyl isobutyl ketone, cyclohexanone, methanol, ethanol, propanol, butanol, ethylcellosolve, butylcellosolve, methylcarbitol, ethylcarbitol, butylcarbitol, dioxane, butylcarbitol acetate, thexanol, ethyl acetate, butyl acetate and the like.

The "aqueous fluororesin dispersion" involved in the present invention has now been fully described.

Repeatedly, it is to be noted that the fluorine-containing resin (2) of the present invention may be a mixture of a fluororesin and some other resin, hence, when the "aqueous fluororesin dispersion" illustrated above is used as one form of the fluorine-containing resin of the present invention, irrespective of which the aqueous fluororesin dispersion is, not only said aqueous fluororesin dispersion itself but also a mixture thereof with some other resin, preferably an acrylic resin, constitutes one form of the fluorine-containing resin (2) of the present invention.

The fluorine-containing resin (2) of the present invention has now been fully described. The description so far made is summarized below.

(1) The fluorine-containing resin of the present invention comprises a fluororesin or a mixture of fluororesin and some other resin.

(2) Said other resin constituting the fluorine-containing resin of the present invention is preferably an acrylic resin.

(3) One of the fluororesins constituting the fluorine-containing resins of the present invention is a copolymer of a fluoroolefin and a vinyl monomer. In this case as well, said fluorine-containing resin comprises either a fluororesin or a mixture of a fluororesin and some other resin (in particular an acrylic resin).

(4) One of the fluororesins constituting the fluorine-containing resins of the present invention is a copolymer of fluoroolefins. In this case as well, said fluorine-containing resin comprises either a fluororesin or a mixture of a fluororesin and some other resin (in particular an acrylic resin).

(5) In the above case (4), said copolymer of fluoroolefins is preferably a copolymer of vinylidene fluoride and a fluoroolefin other than vinylidene fluoride. In this case, too, said fluorine-containing resin comprises either a fluororesin or a mixture of a fluororesin and some other resin (in particular an acrylic resin).

The constitution of the fluorine-containing resin has now been described in detail.

Since the organosilicon compound (1) and fluorine-containing resin (2) have been fully described, the aqueous dispersion of the present invention which contains them is now described.

The aqueous dispersion of the present invention can be obtained by admixing an aqueous dispersion of the above-mentioned organosilicon compound (1) and the above-mentioned fluorine-containing resin (2) comprising an aqueous fluororesin dispersion. The admixing can be carried out by a method adequately selected from among ordinary methods, for example by stirring the two components using an agitator such as a homogenizing mixer.

The proportions of said two components are such that the ratio (organosilicon compound (1)):(fluorine-containing resin (2)) on the solid weight basis amounts to 50:50 to 99:1. When the amount of the fluorine-containing resin (2) is too small, the durability will be poor, whereby decreases in waterproofing effect will be caused with the lapse of time. When the amount of the fluorine-containing resin (2) is excessive, the natural feel and appearance of the substrates will be impaired. More preferred proportions are 60:40 to 97:3, most preferably 70:30 to 95:5.

The waterproofing agent of the present invention comprises the aqueous dispersion of the present invention as obtained in the above manner.

In the waterproofing agent of the present invention, there may be incorporated, when desired, a curing agent for the purpose of further improving the durability and solvent resistance of the coat film formed from the film-forming composition. As mentioned above, the acrylic resin contained in the above-mentioned fluorine-containing resin (2) may have functional groups in some instances and, in such a case, said fluorine-containing resin (2) has functional groups reactive with the curing agent. Said curing agent is not particularly restricted but includes, for example, isocyanate-based curing agents, melamine-based curing agents and the like.

Although the reasons why the waterproofing agent of the present invention has very good waterproofing and decorating effects are not fully clear, it is supposed that the organosilicon compound (1) restricted in its proportion as mentioned above acquires an excellent water-repelling effect and, at the same time, the fluorine-containing resin (2) contained in said composition provides such durability that the composition can stand long use.

In preparing the waterproofing agent of the present invention, appropriate additives may be incorporated in addition to the constituents mentioned above. Such additives are not particularly restricted but include, for example, pigments, preservatives, antibacterial agents, antifungal agents, fire retardants, surface modifiers, curing catalysts, viscosity modifiers, leveling agents, ultraviolet absorbers, antiskinning agents, dispersants, antifoams, and like known additives in general use. The addition amount of these are not particularly restricted, either, but respective ordinary addition amounts can be employed.

In cases where an antimicrobial agent (preservative agent and/or antifungal agent) is added to the waterproofing agent of the present invention, said composition can simultaneously produce its effects as a preservative or antifungal paint film. Said composition may further be applied as a muddy water staining preventing agent or the like, depending on the kind of additive. A waterproofing agent having such antifungal activity also constitutes an aspect of the present invention.

Said antimicrobial agent is not particularly restricted but includes, for example, Nopcocide SN-135 (product of Sun Nopco), Nopcocide N-54-D (ditto), Marinecide SN-70718 (ditto), Nopcocide SN-215 (ditto), Nopcocide 96 (ditto), Deltop (product of Takeda Chemical Industries), Slaoff S (ditto), Slaoff 95 (ditto), Deltop 110 (ditto), Coatcide D (ditto), Coatcide 55D (ditto), Monicide WG (ditto), Slaoff AB (ditto), Slargen L (ditto), Baycam AK-LN (product of Otsuka Pharmaceutical), Baycam AK-LS (ditto) and so on.

A coated article produced by application of the waterproofing agent of the present invention also constitutes an aspect of the present invention.

Said coated article includes various species, for example articles whose surface is porous. As such porous building and construction materials having a porous surface, there may be mentioned, for example, architectural concrete, lightweight concrete, precast concrete, autoclaved lightweight concrete (ALC) and other concrete species; asbestos slates, mortar, calcium silicate boards, pulp cement boards, cement excelsior boards, gypsum boards, hardboards, plaster, bricks, blocks, tiles, gypsum plaster, dolomite plaster, natural stones, artificial stones, glass wool and other inorganic porous building and construction materials; wood boards, plywood, particle boards and other organic porous building and construction materials. Among these, concrete is suitably used.

Considering that the excellent effects of the waterproofing agent of the present invention are mainly produced at places where concrete structures are in contact with the outside, there can be used a method for said concrete structures which comprises applying the waterproofing agent of the present invention to the surface portions of the concrete structures which have already been constructed.

Concrete coated with the waterproofing agent of the present invention has an excellent waterproofing effect and, therefore, is useful in those fields in which this feature can be positively utilized. For example, such fields include blocks for flood protection, cooling water inlet canals, water tanks for fish culture, water-storing tanks and other water-treatment facilities, which are always in contact with water; prefabricated garages, prefabricated houses, concrete roofing tiles, car body-supporting floors and other shaped articles, where decorativeness is important. Said composition can be utilized in coating these themselves or the surface thereof.

BEST MODES FOR CARRYING OUT THE INVENTION

The following examples illustrate the present invention in further detail. They are, however, by no means limitative of the scope of the present invention.

Preparation of Organosilicon Compound (1)
Synthesis Example 1

A white aqueous emulsion was obtained by admixing 20 g of n-hexyltriethoxysilane, 4 g of polyoxyethylene stearyl ether and 0.02 g of sodium laurate and adding 80 g of water gradually to this mixture with high-speed stirring at 1,500 rpm. This is referred to as "A" in Table 1 under organosilicon compound (1).

Synthesis Example 2

A white aqueous emulsion was obtained by admixing 20 g of n-octyltriethoxysilane, 4 g of polyoxyethylene stearyl ether and 0.02 g of sodium laurate and adding 80 g of water gradually to this mixture with high-speed stirring at 1,500 rpm. This is referred to as "B" in Table 1 under "organosilicon compound (1)".

Synthesis Example 3

A white aqueous emulsion was obtained by admixing 20 g of ethyltriethoxysilane, 4 g of polyoxyethylene stearyl ether and 0.02 g of sodium laurate and adding 80 g of water gradually to this mixture with high-speed stirring at 1,500 rpm. This is referred to as "C" in Table 1 under "organosilicon compound (1)".

Preparation of Fluorine-containing Resin (2)
Synthesis Example 4

A one-liter pressure reaction vessel equipped with a stirrer was charged with 500 mL of deionized water, 0.5 g of ammonium perfluorooctanoate and 5.0 g of a reactive emulsifier of the structure represented by $CH_2=CF-CF_2-OCF(CF_3)CF_2O-CF(CF_3)COOH$. After removing dissolved air by repetitions of feeding of nitrogen gas under pressure, followed by degassing, a monomer mixture composed of VdF/TFE/CTFE (74/14/12 in mole percent) was charged under pressure at 60° C. until the vessel inside pressure reached 8 kgf/cm$^2$. Then, 1.5 g of ethyl acetate was charged under pressure and, further 0.2 g of ammonium persulfate was charged and, while continuously feeding the above monomer mixture so that the vessel inside pressure was maintained constant at 8 kgf/cm$^2$, the polymerization was carried out for 45 hours. The vessel inside was then returned to ordinary temperature and ordinary pressure and the polymerization was terminated thereby, to give an aqueous copolymer dispersion. Elemental analysis revealed that a copolymer of VdF/TFE/CTFE=74/14/12 (in mole percent) was obtained. This is referred to as "aqueous copolymer dispersion SR".

The above "aqueous copolymer dispersion S" (70 g) was charged into a 200-mL four-necked flask equipped with a stirring blade, a condenser and a thermometer. To this was added JS2 (product of Sanyo Chemical Industries) in an amount of 0.5% by weight relative to the solids in said "aqueous copolymer dispersion S". The mixture was heated on a water bath with stirring and, after raising the flask inside temperature at 80° C., an emulsion prepared by emulsifying 10 g of methyl methacrylate (MMA), 1.2 g of cyclohexyl methacrylate (CHMA), 1.5 g of PKA 5003 (product of Nippon Oil and Fat Co.) and 0.3 g of isooctyl thioglycolate with a 0.5% (by weight) aqueous solution of JS2 was added dropwise over 1 hour. Immediately thereafter, 1 mL of 2% (by weight) aqueous ammonium persulfate was added to initiate the reaction. At 3 hours after initiation of the reaction, the flask inside temperature was raised to 85° C. and this temperature was maintained for 1 hour, followed by cooling. The pH was adjusted to 7 with aqueous ammonia and the mixture was then filtered through a 300-mesh wire gauze to give a blue-white aqueous fluororesin dispersion. To this was added diethyl adipate as a film-forming auxiliary in an amount of 5% by weight relative to the solids. The resulting mixture was used in the examples under the designation "A" among "fluorine-containing resins (2)".

Synthesis Example 5

A four-necked flask was charged with 3 weight parts of sodium lauryl sulfate and 160 weight parts of deionized water, and the atemperature was raised to 60° C. in a nitrogen stream. Then, 0.5 weight part of ammonium persulfate and 0.2 weight part of sodium hydrogen sulfite were added, and 100 weight parts of a mixture of methyl methacrylate/ethyl methacrylate/n-butyl methacrylate=63/30/7 (in mole percent) was added dropwise over 3 hours. The temperature at the time of completion of the dropping was controlled at 60 to 70°C.

After completion of the dropping, stirring was continued for 2 hours within the said temperature range and the reaction was allowed to proceed further. The reaction mixture was then cooled and adjusted to pH 8 to 9 with 15% aqueous ammonia, to give a stable emulsion with a solid content of 30%. This is referred to as "acrylic emulsion resin".

Said "acrylic emulsion resin" and the above-mentioned "aqueous copolymer dispersion S" were mixed together in proportions of 3:7 on the solid basis by a conventional method, to give an aqueous resin dispersion. To this was then added diethyl adipate as a film-forming auxiliary in an amount of 5% by weight relative to the solids. The resulting composition was used in the examples under the designation "B" among "fluorine-containing resins (2)".

Synthesis Example 6

A 200-mL stainless steel autoclave equipped with a stirrer was charged with 17.8 g of cyclohexyl vinyl ether (CHVE), 4.2 g of polyoxyethylene allyl ether (POEAE; product of Nippon Oil and Fat Co., trademark PKA 5003), 6.1 g of ethyl vinyl ether (EVE), 66.1 g of deionized water, 0.3 g of ammonium perfluorooctanoate (emulsifier), 0.35 g of potassium carbonate, 0.02 g of sodium hydrogen sulfite and 0.08 g of ammonium persulfate (initiator). The autoclave was cooled with ice and pressurized with nitrogen gas to 3.5 kgf/cm$^2$ and then degassed. This pressurization and degassing procedure was repeated twice and then evacuation was performed to 10 mmHg, to remove dissolved oxygen. Thereafter, 27.5 g of chlorotrif luoroethylene (CTFE) was charged, and the reaction was carried out at 30° C. for 12 hours, to give an aqueous resin dispersion. To this was added diethyl adipate as a film-forming auxiliary in an amount of 5% by weight relative to the solids. The resulting composition was used in the examples under the designation "C" among "fluorine-containing resins (2)".

Synthesis Example 7

To the above-mentioned "acrylic emulsion resin" was added diethyl adipate as a film-forming auxiliary in an amount of 5% by weight relative to the solids. The resulting composition was used in the examples under the designation "D" among "fluorine-containing resins (2)".

Examples and Comparative Examples

Concrete was employed as the substrate. Each test composition was applied to the surface of concrete in an amount of 5 g/m$^2$ on the solid basis, and the appearance and the angle of contact with water were determined as mentioned below. Thereafter, each coated concrete specimen was subjected to testing in a SWOM (sunshine weather-o-meter) for 1,000 hours and then the appearance and the angle of contact with water were determined in the same manner. The results thus obtained are shown in Table 1.

Appearance

The surface of the substrate concrete was measured for chromaticity using a measuring apparatus manufactured by Nippon Denshoku Kogyo. After application of each test composition and drying thereof, the chromaticity was measured in the same manner. The color difference (ΔE) was calculated and evaluated as follows:

Before SWOM

○: The color difference between the board after application and drying and the uncoated board is less than 1.
○Δ: The color difference between the board after application and drying and the uncoated board is 1 to 2.
Δ: The color difference between the board after application and drying and the uncoated board is 2 to 4.
X: The color difference between the board after application and drying and the uncoated board is more than 4.

After SWOM

○: The color difference from the uncoated board is less than 1.
○Δ: The color difference from the uncoated board is 1 to 2.
Δ: The color difference from the uncoated board is 2 to 4.
X : The color difference from the uncoated board is more than 4.

Measurement of Angle of Contact with Water

For each test composition, the angle of contact with water was determined before application and after application and drying. The measurement was performed by the droplet method using a Kyowa Kaimen Kagaku model CA-DT measuring apparatus.

TABLE 1

|  | Example | | | | | | | | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| Organic silicone compound (1) (weight parts) | | | | | | | | | | | | | |
| A | 95 | 90 | 0 | 90 | 80 | 70 | 70 | 60 | 50 | 0 | 0 | 90 | 70 |
| B | 0 | 0 | 90 | 0 | 0 | 0 | 0 | 0 | 0 | 0 | 0 | 0 | 0 |
| C | 0 | 0 | 0 | 0 | 0 | 0 | 0 | 0 | 0 | 90 | 70 | 0 | 0 |
| Fluorine-containing resin (2) (weight parts) | | | | | | | | | | | | | |
| A | 5 | 10 | 10 | 0 | 20 | 30 | 0 | 40 | 50 | 10 | 30 | 0 | 0 |
| B | 0 | 0 | 0 | 10 | 0 | 0 | 30 | 0 | 0 | 0 | 0 | 0 | 0 |
| C | 0 | 0 | 0 | 0 | 0 | 0 | 0 | 0 | 0 | 0 | 0 | 10 | 30 |
| D | 0 | 0 | 0 | 0 | 0 | 0 | 0 | 0 | 0 | 0 | 0 | 0 | 0 |
| Before SWOM test | | | | | | | | | | | | | |
| appearance | ○ | ○ | ○ | ○ | ○ | ○ | ○ | ○ | ○ | ○ | ○ | ○ | ○ |
| Water contact angle (°) | 122 | 126 | 127 | 126 | 124 | 124 | 123 | 118 | 115 | 112 | 105 | 125 | 122 |
| After SWOM test | | | | | | | | | | | | | |
| appearance | ○ | ○ | ○ | ○ | ○ | ○ | ○ | ○ | ○ | ○ | ○ | ○ | ○ |
| Water contact angle (°) | 116 | 122 | 120 | 105 | 121 | 118 | 97 | 114 | 110 | 93 | 91 | 93 | 92 |

|  | Comparative Example | | | | | | |
| --- | --- | --- | --- | --- | --- | --- | --- |
|  | 1 | 2 | 3 | 4 | 5 | 6 | 7 |
| Organic silicone compound (1) (weight parts) | | | | | | | |
| A | 40 | 30 | 100 | 0 | 95 | 0 | 0 |
| B | 0 | 0 | 0 | 100 | 0 | 0 | 0 |
| C | 0 | 0 | 0 | 0 | 0 | 0 | 0 |
| Fluorine-containing resin (2) | | | | | | | |

TABLE 1-continued

| (weight parts) | | | | | | | |
|---|---|---|---|---|---|---|---|
| A | 60 | 70 | 0 | 0 | 0 | 100 | 0 |
| B | 0 | 0 | 0 | 0 | 0 | 0 | 0 |
| C | 0 | 0 | 0 | 0 | 0 | 0 | 0 |
| D | 0 | 0 | 0 | 0 | 0 | 0 | 100 |
| Before SWOM test | | | | | | | |
| appearance | ○Δ | Δ | ○ | ○ | ○ | x | x |
| Water contact angle (°) | 95 | 92 | 125 | 123 | 124 | 85 | 75 |
| After SWOM test | | | | | | | |
| appearance | ○Δ | Δ | x | x | x | x | x |
| Water contact angle (°) | 93 | 91 | 10 | 15 | 36 | 82 | 18 |

INDUSTRIAL APPLICABILITY

The waterproofing agent of the present invention has the above-mentioned constitution and therefore has both waterproofing and decorative effects and is very useful as a waterproofing agent for porous building and construction materials.

What is claimed is:

1. An aqueous dispersion which comprises an organosilicon compound (1) represented by the following general formula (I):

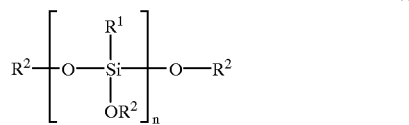

(I)

wherein $R^1$ represents a saturated alkyl group containing 1 to 18 carbon atoms and may be the same or different when n is 2 or more; $R^2$ represents a saturated alkyl group containing 1 to 5 carbon atoms and may be the same or different when n is 2 or more; and n represents an integer of 1 to 9, and a fluorine-containing resin (2) comprising an aqueous fluororeresin dispersion, the weight ratio, on the solid basis between said organosilicon compound (1) and said fluorine-containing resin (2) is organosilicon compound (1): fluorine-containing resin (2)=60:40 to 97:3.

2. The aqueous dispersion according to claim 1 wherein $R^1$ is a saturated alkyl group containing 5 to 18 carbon atoms.

3. The aqueous dispersion according to claim 1 wherein said fluorine-containing resin (2) comprises a fluororesin or a mixture of a fluororesin and an other resin.

4. The aqueous dispersion according to claim 3, wherein said other resin is an acrylic resin.

5. The aqueous dispersion according to claim 3, wherein said fluororesin is a copolymer of a fluoroolefin and a vinyl monomer.

6. The aqueous dispersion according to claim 3 wherein said fluororesin is a copolymer of fluoroolefins.

7. The aqueous dispersion according to claim 6 wherein said copolymer of fluoroolefins is a copolymer of a vinylidene fluoride and a fluoroolefin other than vinylidene fluoride.

8. A waterproofing agent which comprises the aqueous fluororesin dispersion according to claim 1.

9. A coated article which is coated with the waterproofing agent, according to claim 8.

10. The coated article according to claim 9 whose surface is a porous substrate.

11. A coated article according to claim 10 wherein the porous substrate is concrete.

12. The aqueous dispersion according to claim 7 wherein the fluorine-containing resin comprises a fluororesin prepared by seed polymerization of an acrylic resin.

13. A waterproofing agent which comprises the aqueous fluororesin dispersion according to claim 12.

14. A coated article which is coated with the waterproofing agent according to claim 13.

15. The coated article according to claim 14 whose surface is a porous substrate.

16. The coated article according to claim 15 wherein the porous substrate is concrete.

17. The aqueous dispersion according to claim 2 wherein said fluorine-containing resin (2) comprises a fluororesin or a mixture of a fluororesin and an other resin.

* * * * *